No. 716,937. Patented Dec. 30, 1902.
A. K. ROSENBECK.
CLOTHES LINE HOLDER.
(Application filed Mar. 20, 1902.)

(No Model.)

WITNESSES.
H. A. Lamb
J. W. Atherton

INVENTOR.
Andrew K. Rosenbeck
By A. M. Wooster
Atty.

UNITED STATES PATENT OFFICE.

ANDREW K. ROSENBECK, OF STAMFORD, CONNECTICUT.

CLOTHES-LINE HOLDER.

SPECIFICATION forming part of Letters Patent No. 716,937, dated December 30, 1902.

Application filed March 20, 1902. Serial No. 99,077. (No model.)

*To all whom it may concern:*

Be it known that I, ANDREW K. ROSENBECK, a citizen of the United States, residing at Stamford, county of Fairfield, State of Connecticut, have invented a new and useful Clothes-Line Holder, of which the following is a specification.

My invention has for its object to provide a clothes-line holder adapted for general use, and especially adapted for use where the operator desires to put out and take in clothes from a window or balcony, the device being adapted to support one end of a pulley clothes-line extending between buildings or fixtures at a distance above the ground, the special object being to provide convenient means for slackening and tightening the line and for moving it in or out.

Figure 1:
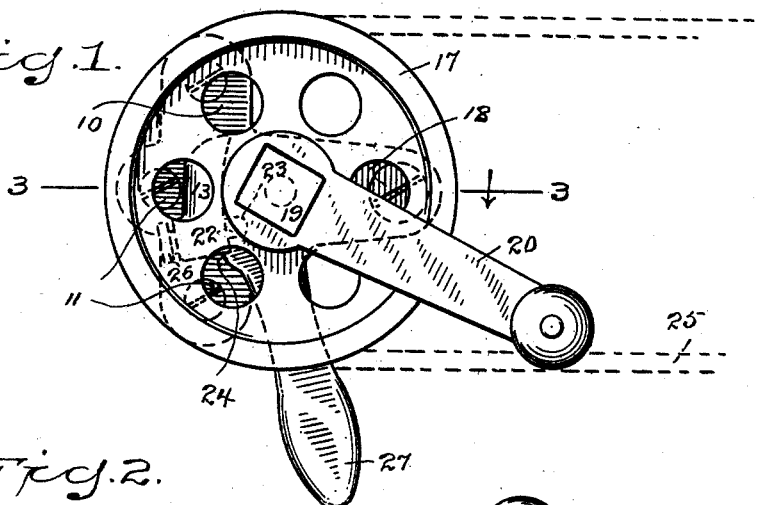
Figure 2:
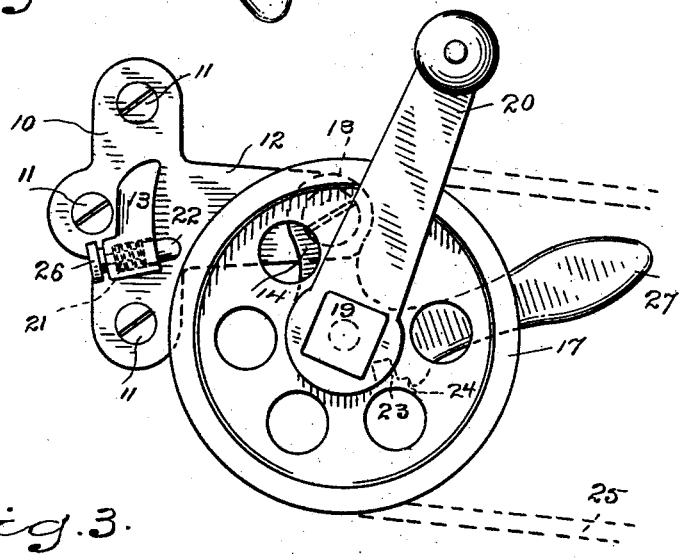
Figure 3:
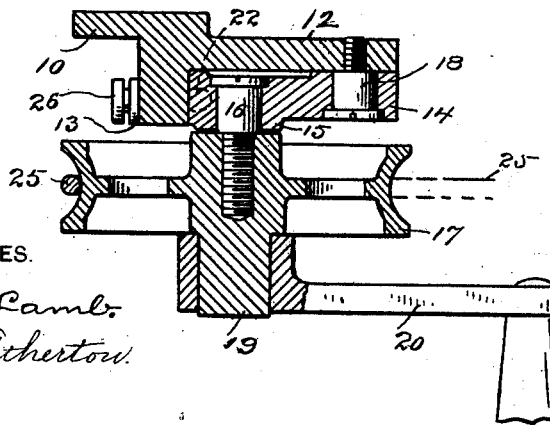

In the accompanying drawings, forming part of this specification, Figure 1 is a side elevation showing my novel line-holder in use and in position to tighten a line; Fig. 2, a similar view, the swinging arm being released as when it is desired to slacken the line; and Fig. 3 is a section on the line 3 3 in Fig. 1.

10 denotes a bracket which is adapted for attachment to a window-casing or a pillar in any suitable position and in any manner, as by screws 11, and which is provided with an arm 12 and a lateral boss 13.

14 denotes a swinging arm which is pivoted at the outer end of arm 12, as at 18, and is adapted to drop down vertically, as in Fig. 2, or to be swung upward alongside of the arm 12 and into engagement with the boss, as in Fig. 1. The swinging arm is provided with a hub 15, in which the stud 16 of the pulley 17 is journaled, the stud and pulley in this instance turning together. The hub of pulley 17 is shown as provided with an angular extension 19 to receive a detachable crank 20. The boss is shown as provided with a socket 21 to receive a spring-bolt 22, and hub 15 on the swinging arm is shown as provided with a recess 23 to receive the end of the bolt and with a stop 24, which engages the boss to limit the upward movement of the swinging arm.

25 denotes a line upon the pulley.

The operation will be obvious from the drawings. When it is desired to slacken the line, the operator withdraws the spring-bolt by means of a head 26, which is provided for convenience in operation, and allows the swinging arm and the pulley to instantly drop down, as in Fig. 2. To tighten the line again, the operator swings the arm and the pulley upward to the engaging position, as in Fig. 1, the spring-bolt yielding as the swinging arm moves to place and then automatically engaging the socket as soon as the stop comes into engagement with the boss. A handle 27 is provided on the swinging arm for convenience in swinging the pulley upward to place. If desired, the crank may be removed at any time to prevent interference with the line. When the swinging arm and the pulley are in operative position, as in Fig. 1, the line will be tightened and may be moved in or out by turning the pulley by means of the crank.

While the details of construction illustrated in the drawings are perfectly satisfactory in use, it is to be understood that they may be widely varied. The invention is not, therefore, to be limited to the specific details of construction which I have described and shown.

What is claimed is—

1. A clothes-line holder comprising a bracket having an arm and a boss at one side of said arm, a swinging arm pivoted to the outer end of the bracket-arm and adapted to swing backward alongside thereof, and having a pulley at its outer end, and means carried by said boss for engaging the outer end of the swinging arm to lock the swinging arm.

2. A clothes-line holder comprising a bracket having an arm and a boss at one side of said arm, a swinging arm pivoted to the outer end of the bracket-arm and adapted to swing alongside thereof and having a pulley at its outer end, the outer end of said swinging arm having a recess, and a spring-bolt mounted in said boss and adapted to engage the recess of the swinging arm.

In testimony whereof I affix my signature in presence of two witnesses.

ANDREW K. ROSENBECK.

Witnesses:
JOSEPH L. WOLFE,
JOHN WHITE.